UNITED STATES PATENT OFFICE.

FRANK L. O. WADSWORTH, OF ALLEGHENY, PENNSYLVANIA.

MANUFACTURE OF SHEETS OF GLASS.

No. 797,646.     Specification of Letters Patent.     Patented Aug. 22, 1905.

Application filed June 18, 1903. Renewed January 21, 1905. Serial No. 242,107.

*To all whom it may concern:*

Be it known that I, FRANK L. O. WADSWORTH, of Allegheny, Allegheny county, Pennsylvania, have invented a new and useful Improvement in the Manufacture of Sheets of Glass, of which the following is a full, clear, and exact description, reference being had to the accompanying drawings, forming part of this specification, in which—

Figure 1:
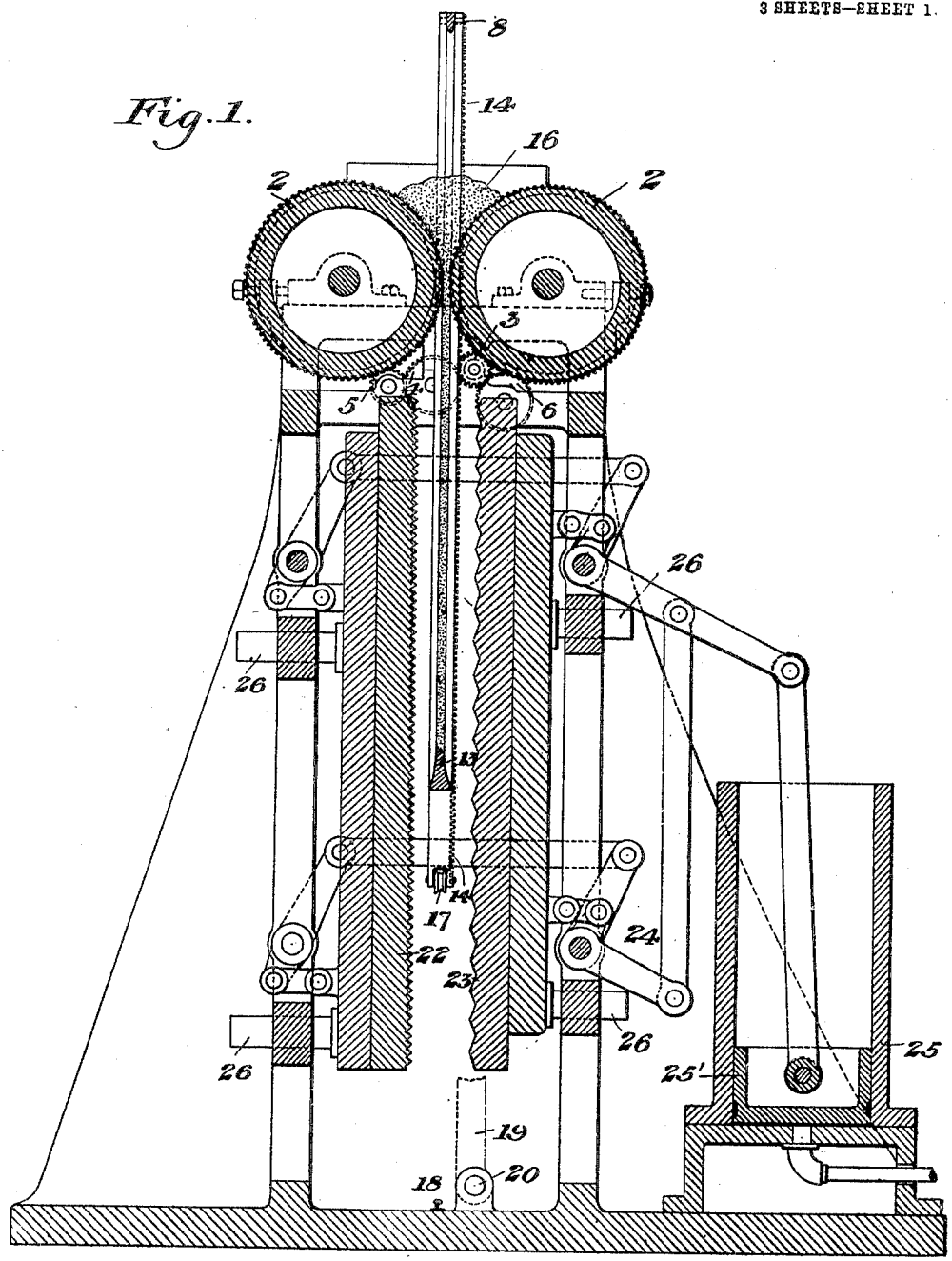
Figure 2:
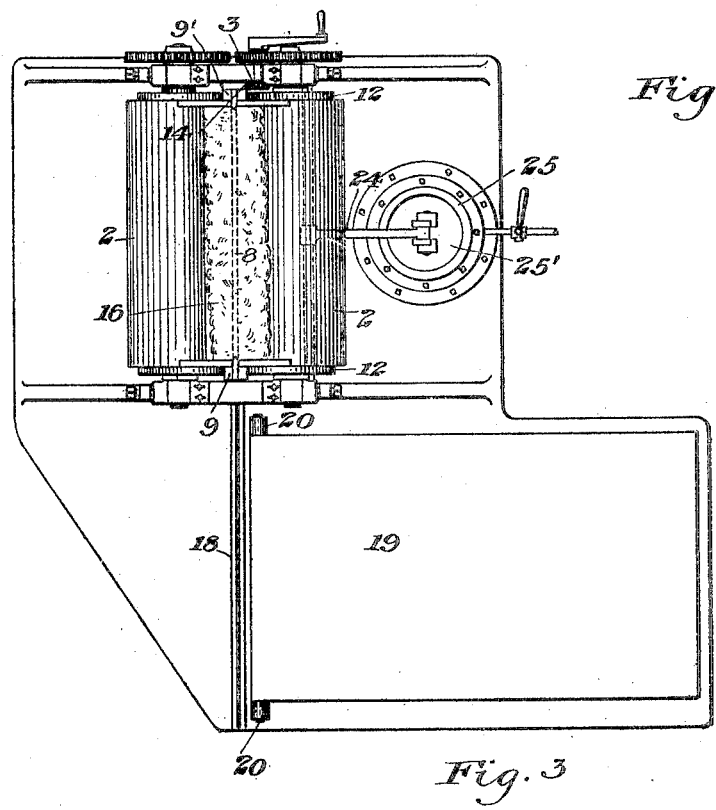
Figure 3:
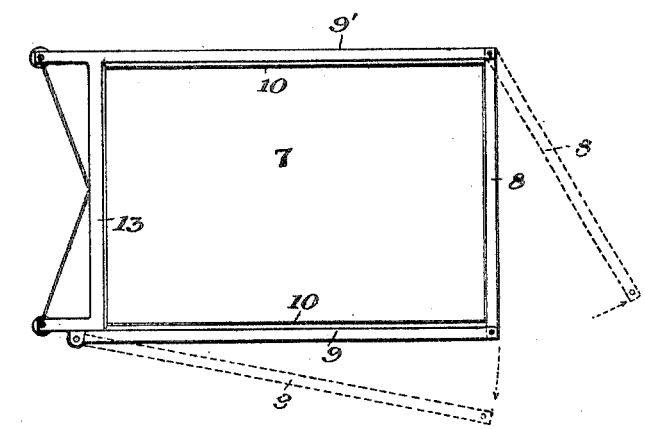
Figure 4:
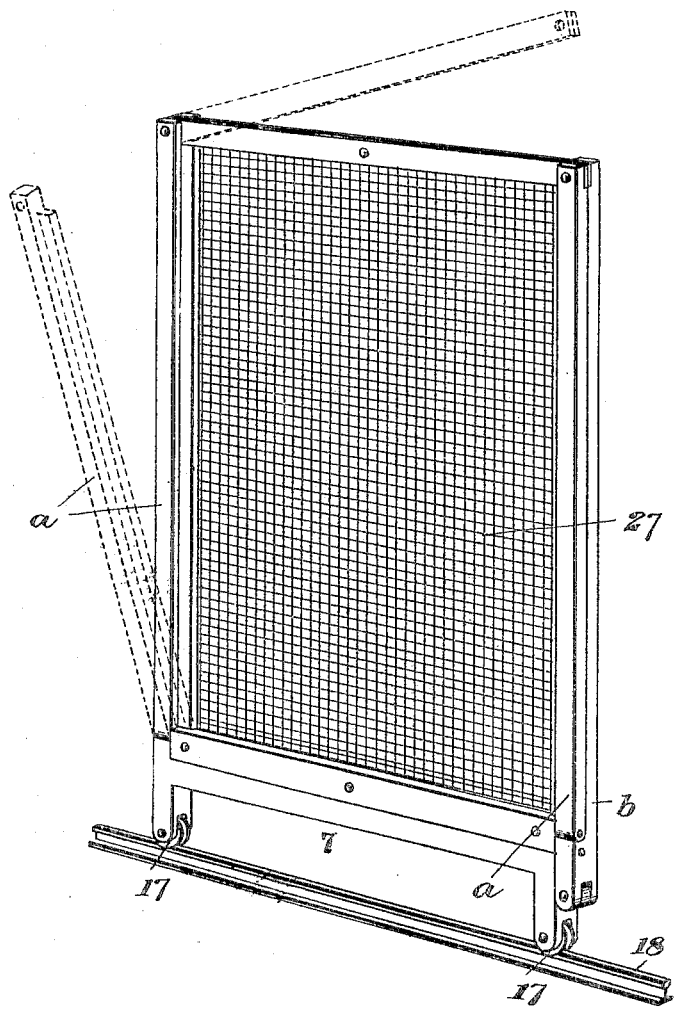

Figure 1 is a vertical section of a machine suitable for the practice of my invention. Fig. 2 is a plan view. Fig. 3 is a detail of the frame for holding the glass sheet, and Fig. 4 is a perspective view of a modified form of frame which I may employ in making wire-glass.

Attempts have been made heretofore to roll glass sheets by causing the plastic glass to pass between two forming-rolls in a manner similar to the rolling of metal, but so far as I know these attempts by others have been unsuccessful, and I believe that the cause of the unsuccess has been the lack of means for holding and controlling the glass as it emerged from the rolls, and thus preventing distortion of the sheet.

My invention is designed to provide means by which rolls can be used successfully for this purpose, and glass sheets thus produced very rapidly and with both surfaces of equal quality. Where a roll and a rolling-table are used as in the process ordinarily employed, the side of the sheet formed in contact with the table is always of inferior finish.

My invention consists in rolling a glass sheet between rolling-surfaces and as the sheet is delivered from the rolls simultaneously supporting it in contact with the air on both sides with a support which travels with the glass.

In the drawings, in which I show apparatus suitable for the practice of my invention, 2 2 are the forming-rolls, journaled in suitable supports and driven at equal speed by gearing 3 4 5 6.

For the purpose of supporting the glass as it is rolled I employ a frame 7, (shown in Figs. 3 and 4,) two of the marginal bars of which are hinged, as shown at 8 9 in Fig. 3. The frame is of the size of the sheet desired to be rolled and the inner edges of its side bars 9 9' are contracted in thickness, as at 10, to the thickness desired for the sheet. In order that the frame may be passed between the rolls, the bar 8 is of the same thickness as the sheet desired and the rolls have reduced portions 12 at their ends for the passage of the side bars 9 9'. The bottom bar 13 has its upper surface shaped, as shown in Fig. 1, so as to fit between the rolls on the delivery side of the pass. The frame has a rack 14, which meshes with the driving-pinion 3, so that as the rolls rotate the frame will be moved between them at the same surface speed.

In the practice of my invention the frame is retracted until the end bar 13 fits within and closes the roll-pass, and a body of plastic glass 16 is then delivered to the rolls. As the rolls rotate the glass will be rolled into the form of a sheet, its lower edge being attached to the bar 13, and as the frame travels between the rolls at the same rate as the sheet the glass will attach itself to the side bars and will be supported thereby, so that when the frame is finally delivered it will contain a glass sheet attached at its edges and supported and held thereby. Being thus supported by the frame and in contact with the air on both its faces a sheet of very fine finish is produced. When the frame is delivered from the rolls, it is removed and the finished sheet detached. For this purpose I prefer to provide the frame with wheels 17, adapted to rest upon a rail 18 when the frame is at its lowest position. The frame carrying the sheet can then be moved edgewise opposite to a table 19, which is hinged at 20 and stands in a vertical position. The frame is rested against the table and the table is turned back to a horizontal position, so as to support the glass sheet, whereupon the sides 8 and 9 of the frame can be opened, as shown in Fig. 3, and the sheet released therefrom.

If it be desired to impress a figured surface or surfaces or a prism surface upon the glass sheet, I employ patterned pressure-plates 22 23, set below the rolls on opposite sides of the path of the frame, and lever mechanism 24, actuated by hand or by a power-cylinder 25. When the sheet has been delivered from the rolls and the frame is in its lowest position, the piston 25' of the cylinder 25 may be projected, whereupon the pressure-plates will be forced together upon the intermediate glass sheet and the pattern will be impressed upon the glass. These pressure-plates may have plain surfaces and may be used for the purpose of flattening or straightening the sheet of glass. To guide the pressure-plates and to insure parallelism of motion, I prefer to provide them with guides 26.

My invention is of great utility in the manufacture of wire-glass. For this purpose I may construct the frame, as shown in Fig. 4, with each of its margins formed of two bars *a b*, the bar *a* being pivoted to the bar *b*. The wire mesh 27 to be embedded in the glass is stretched between the bars of the frame and is held taut by securing the bars together. When the frame thus constituted is passed between the rolls, the glass sheet will be spread on both sides of the wire mesh, producing an even sheet of uniform thickness throughout and with the wire exactly in the middle or at any desired distance from either surface.

Within the scope of my invention as defined in the claims the skilled manufacturer of glass will be able to modify in various ways the apparatus employed for practicing the process, since I believe that my invention is broadly new in that I roll a glass sheet between rolling-surfaces and by supporting means external to the glass—*i. e.*, other than the sheet itself—support it below the rolling-surfaces in contact with the air on both sides, and I intend to claim the same irrespective of the particular mechanism which may be employed.

I claim—

1. The method of making glass sheets, which consists in forming a sheet between rolling-surfaces, and as it is delivered supporting the sheet by its margin only; substantially as described.

2. The method of making glass sheets, which consists in forming a sheet between rolling-surfaces and as it is delivered supporting it by external means attached to the margin only of the sheet, both surfaces of said sheet remaining in contact with the air throughout; substantially as described.

3. The method of making glass sheets, which consists in forming a sheet between rolling-surfaces and as it is delivered supporting it by its margin only, and maintaining said support until the sheet has been delivered from the rolls; substantially as described.

4. The method of making glass sheets, which consists in forming a sheet between rolling-surfaces on both sides of an intermediate mesh and supporting the sheet by means applied at the edges only of the mesh; substantially as described.

5. The method of making glass sheets, which consists in forming a sheet at one operation between rolling-surfaces on both sides of an intermediate mesh and supporting the mesh by its edges only before introducing it between the rolls; substantially as described.

6. The method of making glass sheets, which consists in applying rolling-surfaces to each side of a body of glass and thereby rolling it into a sheet, supporting said sheet by its margin only, and then subjecting it to the action of pressing-surfaces on both sides; substantially as described.

7. The method of making glass sheets, which consists in forming a sheet between rolling-surfaces, supporting said sheet in a vertical plane by external means applied at its margin only, and then subjecting both its surfaces to the simultaneous action of pressing-surfaces; substantially as described.

8. The method of making glass sheets, which consists in forming a sheet between rolling-surfaces on both sides of an intermediate mesh while the mesh is supported by its margin only, and then subjecting the surface of the sheet to the action of figured pressing-surfaces; substantially as described.

9. The method of making glass sheets, which consists in forming a sheet between rolling-surfaces on both sides of an intermediate mesh, supporting the rolled sheet in a vertical plane by its margin only, and then subjecting both surfaces of the sheet to the simultaneous action of figured pressing-surfaces; substantially as described.

In testimony whereof I have hereunto set my hand.

FRANK L. O. WADSWORTH.

Witnesses:
 THOMAS W. BAKEWELL,
 GEO. B. BLEMING.